(12) United States Patent
Park et al.

(10) Patent No.: US 8,855,720 B2
(45) Date of Patent: *Oct. 7, 2014

(54) METHOD AND APPARATUS FOR PROVIDING A PLURALITY OF SCREENS IN IDLE STATE OF MOBILE TERMINAL

(75) Inventors: Youngmin Park, Gyeonggi-do (KR); Hoojong Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,699

(22) Filed: May 8, 2012

(65) Prior Publication Data

US 2012/0220344 A1   Aug. 30, 2012

Related U.S. Application Data

(63) Continuation of application No. 11/911,277, filed as application No. PCT/KR2006/002302 on Jun. 15, 2006.

(51) Int. Cl.
*H04M 1/00* (2006.01)
*H04M 1/725* (2006.01)

(52) U.S. Cl.
CPC ........ *H04M 1/72522* (2013.01); *H04M 1/7258* (2013.01)
USPC ............................ 455/566; 715/810; 715/813

(58) Field of Classification Search
USPC ............ 455/566, 418, 412.1, 550.1; 345/212, 345/213, 156, 473; 715/838, 744, 810, 817, 715/243
See application file for complete search history.

(56) References Cited

U.S. PATENT DOCUMENTS

| | | | |
|---|---|---|---|
| 2001/0029193 A1* | 10/2001 | Ishigaki | 455/566 |
| 2004/0062440 A1* | 4/2004 | Srinivasa | 382/173 |
| 2004/0250217 A1* | 12/2004 | Tojo et al. | 715/810 |
| 2006/0030370 A1* | 2/2006 | Wardimon | 455/566 |
| 2006/0030371 A1* | 2/2006 | Tanaka et al. | 455/566 |
| 2006/0084477 A1* | 4/2006 | Wardimon et al. | 455/566 |
| 2006/0095916 A1 | 5/2006 | Nishida | |
| 2006/0290661 A1* | 12/2006 | Innanen et al. | 345/156 |
| 2007/0035513 A1* | 2/2007 | Sherrard et al. | 345/157 |
| 2007/0257097 A1* | 11/2007 | Nurmela et al. | 235/375 |

FOREIGN PATENT DOCUMENTS

| | | |
|---|---|---|
| JP | 2001-245352 | 9/2001 |
| KR | 10-2003-0083896 | 4/2005 |

* cited by examiner

*Primary Examiner* — Golam Sorowar
(74) *Attorney, Agent, or Firm* — Lowe Hauptman & Ham, LLP

(57) ABSTRACT

The present disclosure is a method for providing a plurality of screens in an idle state of a mobile terminal, comprising; allocating at least one application program to each of the screens, based on a user selection; displaying a first screen among the plurality of screens in the idle state; receiving a screen switch request from a user; and turning the screens one by one based on the screen switch request so as to display the at least one application program allocated to each of the screens.

16 Claims, 5 Drawing Sheets

5 a          5 b

METHOD AND APPARATUS FOR PROVIDING A PLURALITY OF SCREENS IN IDLE STATE OF MOBILE TERMINAL

CROSS-REFERENCE TO RELATED APPLICATIONS

This application is a continuation of U.S. patent application Ser. No. 11/911,277 filed on Oct. 11, 2007, which is the National Phase application of International Application No. PCT/KR2006/002302, filed Jun. 15, 2006, which designates the United States and was published in English. This application, in its entirety, is incorporated herein by reference the entire disclosure of which is incorporated herein by reference.

TECHNICAL FIELD

The present disclosure relates to an apparatus and a method for providing a spin-home function for a mobile communication terminal. More particularly, the present disclosure relates to an apparatus and a method for providing a spin-home function for a mobile communication terminal so that, when a user of the mobile communication terminal, which includes a key input module, a microprocessor, a program memory, a data storage module, and an LCD display module, designates an application, which is stored in the program memory, as a spin-home and runs a spin-home program, the application, which has been designated as the spin-home, is circulated and displayed on the LCD display module every time the user operates a specific key.

BACKGROUND OF THE INVENTION

As generally known in the art, mobile communication systems have evolved from 1.sup.st generation analog AMPS (Advanced Mobile Phone System) and 2.sup.nd generation cellular/PCS (Personal Communication Service) systems into 3.sup.rd generation IMT-2000 (International Mobile Telecommunication 2000), which has been recently standardized by ITU-R and commercialized in line with development in information/communication technologies. The IMT-2000 includes CDMA 2000 1X, 3X, EV-DO, and WCDMA (Wideband CDMA) and uses an IS-95SC network, which has evolved from conventional IS-95A and IS-95B networks, so that it can provide a wireless Internet service at a maximum data transmission rate of 144 Kbps, which is substantially faster than that of the IS-95A or IS-95B network (14.4 Kbps or 56 Kbps). Particularly, the IMT-2000 not only improves the quality of conventional voice communication service and WBS (Wireless Broadcasting Service), but also provides various multimedia services (e.g. AOD, VOD) at a faster speed.

Such evolution of mobile communication systems are followed by evolution of mobile communication terminals into multipurpose devices, which can provide various types of applications in addition to basic voice communication. Users can download various pieces of multimedia data, such as images, moving pictures, music, and games, and run the data by using mobile communication terminals. Mobile communication terminals incorporate various types of convenient functions (e.g. electronic organizer, photo editor, camera). In addition, mobile communication terminals can realize colorful graphic environment on the idle screen, as a result of improved performance of LCD drivers.

The idle screen is a starting point for using various applications provided by mobile communication terminals. Furthermore, each user can decorate the idle screen with his favorite photo, image, or animation and express his own personality.

Particularly, a user of a conventional mobile communication terminal can download a photo, image, or animation from the service provider and decorate the idle screen with it by using a WAP script. Alternatively, the user may set up the idle screen by downloading a non-interactive application (phone theme) or an interactive application (e.g. "1 mm" or "MoA" service available from SK Telecom., Inc.) and installing it.

Korean Registered Patent No. 10-0486516 discloses a method for using a frequently-used application (e.g. schedule management, text message, address book) for the idle screen of a mobile communication terminal so that its user can directly run the application without complicated steps of operation. This method seeks to enhance the functionality of the mobile communication terminal, in addition to enabling the user to set up the idle screen as desired in an attempt to express his personality.

However, conventional methods for setting up the idle screen have the following problems.

First, once an application is used for the idle screen, it is impossible to present another application on the same idle screen.

Second, when another application is to be used for the idle screen, tree-structured menu items must be searched through a number of steps, which renders it inconvenient to modify the idle screen.

Third, although basic applications (e.g. address book, text message) may be given shortcuts on the key input module for direct access, the limited number of key buttons on the terminal makes it impossible to assign shortcuts to all of the ever-increasing applications.

SUMMARY OF THE INVENTION

Accordingly, the present disclosure has been made to solve the above-mentioned problems occurring in the prior art, and an object of the present disclosure is to provide an apparatus and a method for providing a spin-home function for a mobile communication terminal so that, when a user of the mobile communication terminal, which includes a key input module, a microprocessor, a program memory, a data storage module, and an LCD display module, designates an application, which is stored in the program memory, as a spin-home and runs a spin-home program, the application, which has been designated as the spin-home, is circulated and displayed on the LCD display module every time the user operates a specific key.

In order to accomplish this object, there is provided a method for providing a spin-home function for a mobile communication terminal having a key input module, a microprocessor, a program memory, a data storage module, and an LCD display module so that applications are circulated and displayed on an idle screen, the method including the steps of (a) designating at least one application as a spin-home; (b) running a spin-home program stored in the program memory, when a user operates a first key button for driving the spin-home program, and displaying a first application designated as the spin-home on the LCD display module; (c) circulating next application designated as the spin-home and displaying the application on the LCD display module every time the user operates a second key button for circulating the idle screen; and (d) setting an application currently displayed on the LCD display module as the idle screen when the user operates a confirmation key button.

In accordance with another aspect of the present disclosure, there is provided an apparatus for providing a spin-home function for a mobile communication terminal, the apparatus including a program memory for storing a spin-home program adapted to circulate and display at least one application designated as a spin-home when a user operates a key; a data storage module acting as a data buffer when the spin-home program is run by the mobile communication terminal, the data storage module temporarily storing data inputted by the user or storing character or image data received by the mobile communication terminal from an outside; a key input module for inputting characters and numbers, the key input module having a special key for causing a predetermined function of the mobile communication terminal to be run; an LCD display module for displaying operating conditions of the mobile communication terminal together with date and time, the operating conditions including power utilization condition and radio wave reception strength; and a microprocessor for running the spin-home program, when the user operates a key button for driving the spin-home program, and controlling the LCD display module so as to display a first application designated as the spin-home, the microprocessor controlling the LCD display module so as to display next application in accordance with the spin-home program when the user operates a key button for circulating an idle screen.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE INVENTION

Figure 1:
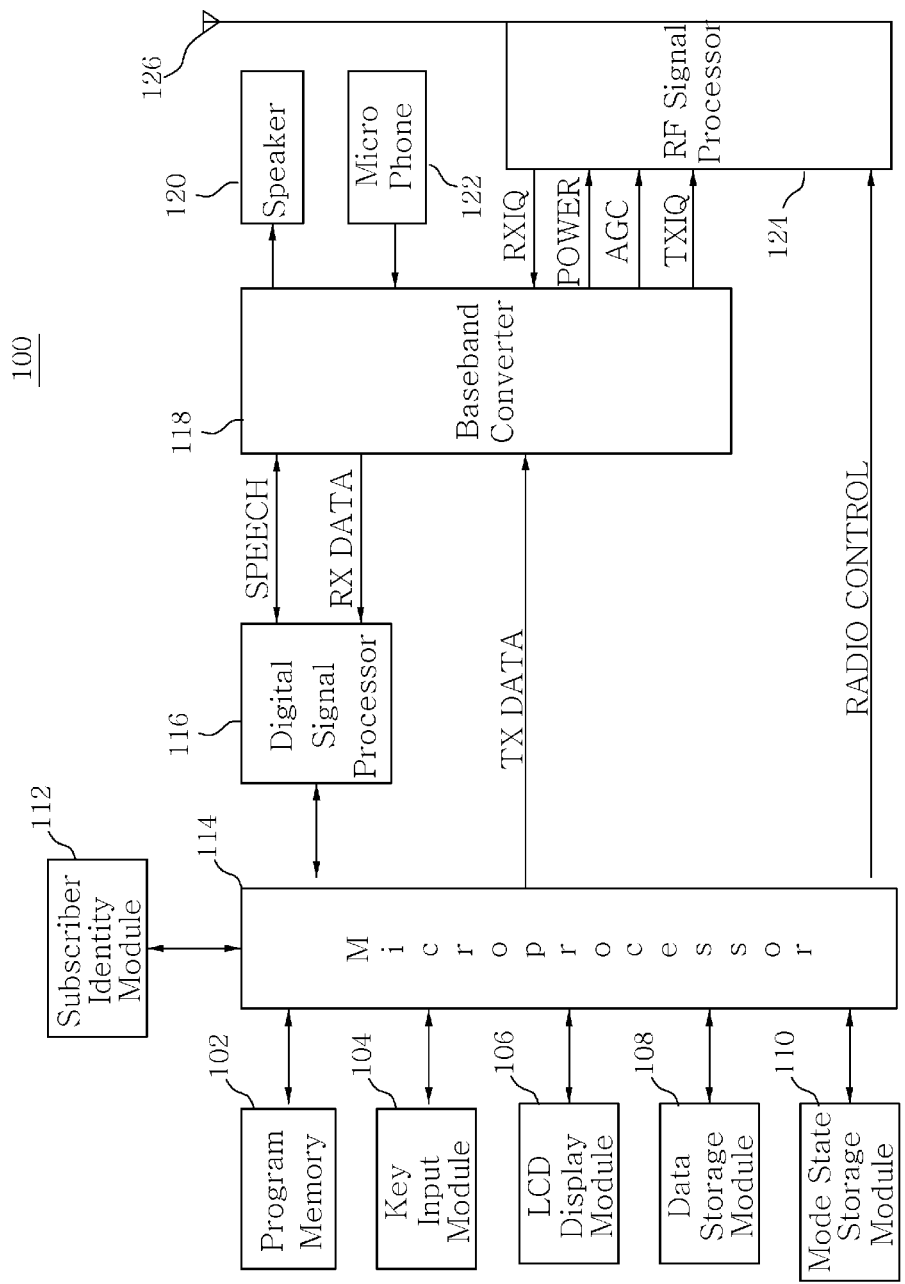
FIG. 1 shows the construction of a mobile communication terminal according to a preferred embodiment of the present disclosure.

Hereinafter, a preferred embodiment of the present disclosure will be described with reference to the accompanying drawings. In the following description and drawings, the same reference numerals are used to designate the same or similar components, and so repetition of the description on the same or similar components will be omitted.

FIG. 1 shows the construction of a mobile communication terminal according to a preferred embodiment of the present disclosure.

A mobile communication terminal 100 according to a preferred embodiment of the present disclosure includes a program memory 102; a key input module 104; an LCD display module 106; a data storage module 108; a mode state storage module 110; a subscriber identity module 112; a microprocessor 114; a digital signal processor 116; a baseband converter 118; a speaker 120; a microphone 122; an RF (radio frequency) signal processor 124; and an antenna 126. The key input module 104 according to a preferred embodiment of the present disclosure has numeric keys for inputting numbers (e.g. telephone numbers), character keys for inputting characters, function keys for performing specific functions, and direction keys. When the user presses a key button, the key input module 104 generates key data, which corresponds to the pressed key button, and transmits the data to the microprocessor 114. Particularly, the key input module 104 may separately have a dedicated spin-home key button for providing a spin-home function.

The program memory 102 according to a preferred embodiment of the present disclosure stores protocol software for processing messages transmitted/received to/from a mobile communication network, an operating system, a control program for controlling the overall operation of the mobile communication terminal, and applications. Particularly, the program memory 102 stores a spin-home program for circulating at least one application, which has been designated as a spin-home, and displaying it on the LCD display module 106 when the user operates the dedicated spin-home key button, which is separately installed on the key input module 102, or one of existing key buttons.

Preferably, the program memory 102 additionally stores a screen setup program for displaying application items, which have been designated as the spin-home, on the LCD display module when the user operates a specific key button while the mobile communication terminal is in an idle mode. When the user selects one or more of the items, the spin-home setup of the selected application is toggled on/off in accordance with the users selection.

The program memory 102 may store a program for managing the contact addresses of persons, with whom the user of the mobile communication terminal 100 makes frequent contact, and displaying the list of a predetermined number of contact addresses in the order of frequent contact on the LCD display module 106 when the user operates a specific key. In addition, the program memory 102 may store a program for extracting contact addresses, to which shortcuts have been assigned, and displaying the list of contact addresses on the LCD display module 106 when the user operates a specific key.

The program memory 102 may also contain a program for creating a list of recently used applications and displaying it on the LCD display module 106.

In addition, the program memory 102 preferably stores a shortcut program for implementing a function similar to that of shortcut icons on the base screen of conventional computers. Particularly, when the user assigns a shortcut to at least one application, an icon is designated for the application. When the user operates a key for selecting a shortcut icon screen in an idle mode, the LCD display module 106 displays the shortcut on the screen. When the user selects a specific icon on the shortcut icon screen, a corresponding application is driven. Although the program automatically designates an icon for the application in this case, the user may select a desired icon.

The program memory 120 for storing various programs may be an EEPROM (electrically erasable and programmable read only memory), for example, which can not only read, but also electrically erase recorded data and rerecord data. Each program may be implemented by using a C programming language, objected-oriented C++, or JAVA, depending on the operating system supported by the mobile communication terminal.

Any of the above-mentioned list of frequently used contact addresses, list of contact addresses having shortcuts assigned thereto, list of recently used application, and shortcut icon screen may be designated as the spin-home, which is displayed on the LCD display module 106 one by one every time the user operates a key button for circulating the idle screen.

The data storage module 108 according to a preferred embodiment of the present disclosure usually acts as a data buffer when the mobile communication terminal 100 runs a program. The data storage module 108 temporarily stores data inputted by the key input module 102. In addition, the data storage module 108 stores other pieces of data, including characters and images received by the mobile communication terminal 100 from the outside. The data storage module 108 may be a RAM (random access memory), for example.

The LCD display module 106 according to a preferred embodiment of the present disclosure displays the operating conditions of the mobile communication terminal 100, including power utilization and radio wave reception strength, together with date and time. When the user operates a key button for circulating the idle screen, the LCD display module 106 replaces the application, which has been designated as the spin-home, with a new one and displays it.

The microprocessor 114 according to a preferred embodiment of the present disclosure controls the overall operation of the mobile communication terminal 100 in accordance with a state flag stored in the mode state storage module 110. Particularly, when the user operates a key button for running a spin-home program and generates a corresponding signal, the microprocessor 114 reads the signal and outputs a spin-home program, which is stored in the program memory 102, to the data storage module 108. Then, the program is run. The microprocessor 114 loads a first application, which has been designated as a spin-home, onto the data storage module in accordance with the program and controls the LCD display module so as to display the application. When the user operates a key button for circulating the idle screen, the microprocessor loads the next application, which has been designated as the spin-home, onto the data storage module in accordance with the spin-home program, which is currently run. Then, the microprocessor controls the LCD display module so as to replace the first application with the next application and display it.

The key button for running the spin-home program or circulating the idle screen may be a dedicated spin-home key button separately installed on the key input module 102 of the mobile communication terminal 100, as mentioned above. Alternatively, existing key buttons may be used to implement the function of the dedicated spin-home key button. For example, when a downward movement button is operated while the mobile communication terminal 100 is in an idle mode, the spin-home program is driven. When a leftward or rightward movement button is operated in this condition, the LCD display module 106 circulates and displays each application, which has been designated as the spin-home, as will be described later in more detail.

The mode state storage module 110 stores the current operating mode of the mobile communication terminal 100 as a state flag (0, 1, 2 . . . ) in accordance with the selection made via the key input module 102. The subscriber identity module 112 stores subscriber registration information (e.g. proper number, personal security key), which is allocated to each subscriber's terminal.

The digital signal processor (hereinafter, referred to as DSP) 116 acts as an equalizer for coding or decoding audio signals and removing multi-path noise, in addition to processing audio data. The DSP 116 transmits/receives audio data SPEECH to/from the baseband converter 118. In addition, the DSP 116 receives digital data RX DATA from the baseband converter 118.

The baseband converter 118 converts signals, which are transmitted/received among the RF signal processor 124, the DSP 116, the speaker 120, and the microphone 122, into baseband signals through DAC (digital to analog conversion) and ADC (analog to digital conversion). The baseband converter 118 sends transmission data TXIQ to the RF signal processor 124 and controls the power POWER of the RF signal processor 124 or automatically controls its gain AGC. In addition, the baseband signal processor 124 gets reception signal RXIQ from the RF signal processor 124.

The RF signal processor 124 demodulates and amplifies RF signals received from the antenna 126. In addition, the RF signal processor 124 modulates transmission signals from the baseband converter 118 and emits them into propagation space. The speaker 120 outputs audible sound based on the audio data from the baseband converter 118 and converts the users voice input into electric signals.

The antenna 126 receives signals from the RF signal processor 124 and transmits them to the outside, and vice versa.

Figure 2:
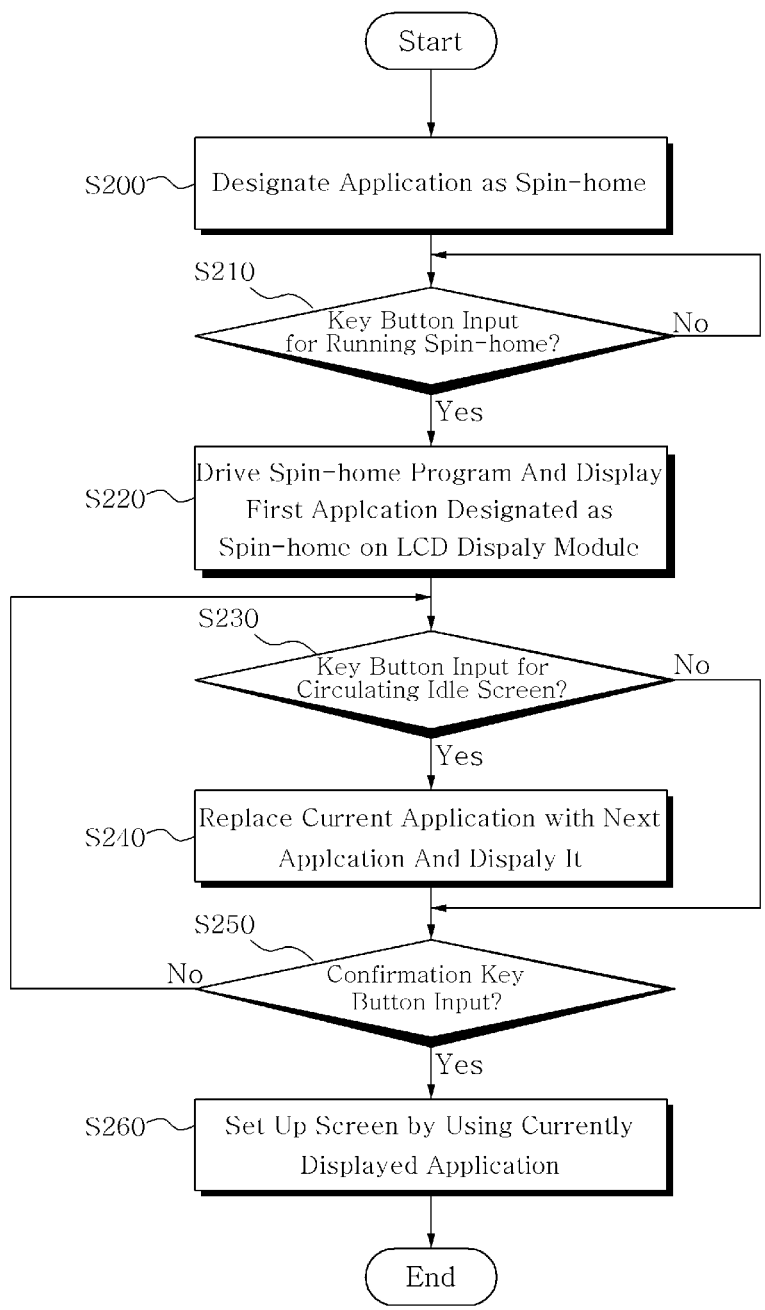
FIG. 2 is a flowchart showing a method for providing a spin-home for a mobile communication terminal according to a preferred embodiment of the present disclosure.

FIG. 2 is a flowchart showing a method for providing a spin-home for a mobile communication terminal according to a preferred embodiment of the present disclosure.

The user of the mobile communication terminal 100 designates at least one application as a spin-home (S200). Particularly, the user selects a spin-home addition/deletion item from menu items of each application and generates a corresponding signal. Then, the microprocessor 114 reads the signal and adds/deletes spin-home number data to/from the selected application. When a spin-home program is run at a later time, each application is circulated and displayed in the order of its number. The user may drive a screen setup program and conveniently modify the spin-home on/off setup of the application, which has been designated as the spin-home. Particularly, when a specific key button (e.g. upward movement key button) is operated while the mobile communication terminal 100 is in an idle mode and a corresponding signal is generated, the microprocessor 114 reads the signal and outputs a screen setup program to the data storage module 108, which is then run. In addition, the microprocessor 114 displays application items, which have been designated as the spin-home, on the LCD display module 106. Then, the user selects at least one of the displayed items and generates a corresponding signal. The microprocessor 114 reads the signal and toggles on/off the spin-home setup of the selected application. If the spin-home setup of an application is toggled off, it is not displayed on the LCD display module 106 even when the spin-home program is run.

Applications designated as the spin-home include schedule management, address book, list of recently used applications, game, text message, and shortcut icon screen, as well as image or moving picture in a broader sense. In the case of address book, the contact address of a specific person, which has been selected by the user, may be designated as the spin-home. It is also possible to designate the contact addresses of persons, which have shortcuts assigned thereto, or a number of frequently used contact addresses, which have been automatically selected by the microprocessor, as the spin-home.

The microprocessor 114 monitors if the key button for driving the spin-home program is operated (S210). When the key button is operated, the microprocessor 114 drives the spin-home program and displays the first application (i.e. application having the smallest spin-home number) of the applications, which have been designated as the spin-home, on the LCD display module 106 (S220).

When the user operates the key button for circulating the idle screen and generates a corresponding signal, the microprocessor 114 reads the signal (S230). Then, the microprocessor 114 replaces the first application with the next application, which has been designated as the spin-home, and displays it on the LCD display module 106 (S240).

When the user operates the confirmation key button OK, the microprocessor 114 sets up the idle screen by using the application, which is currently displayed on the LCD display module 106 (S250, S260). Otherwise, the microprocessor 114 returns to step S230.

FIGS. 3a to 3d show the screen of a mobile communication terminal, which has a dedicated spin-home key button, when the terminal provides a spin-home function.

Figure 3:
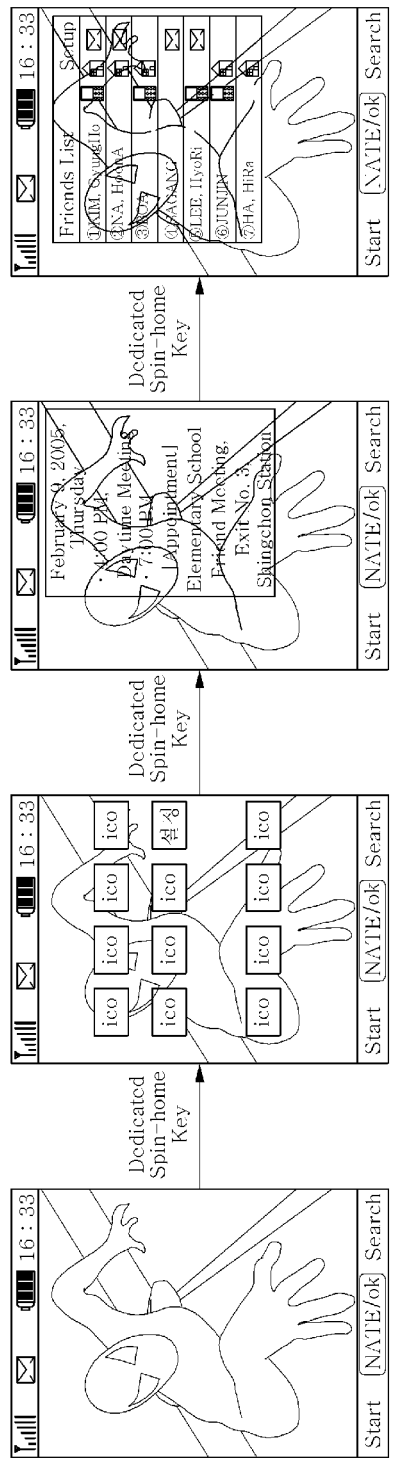
FIGS. 3a to 3d show the screen of a mobile communication terminal, which has a dedicated spin-home key button, when the terminal provides a spin-home function.

FIG. 3a shows the screen in an idle mode before the spin-home program is run. When the dedicated spin-home key button is operated, the spin-home program is run. At the same time, the screen is switched to a shortcut icon screen, which has a spin-home number of 1, as shown in FIG. 3b. Every time the dedicated spin-home button is operated, the schedule management (FIG. 3c), which has a spin-home number of 2, and the list of contact addresses of friends (FIG. 3d), which has a spin-home number of 3, are circulated and displayed.

FIGS. 4a to 4f show the screen of a mobile communication terminal, which has conventional key buttons, when the terminal provides a spin-home function.

Figure 4:
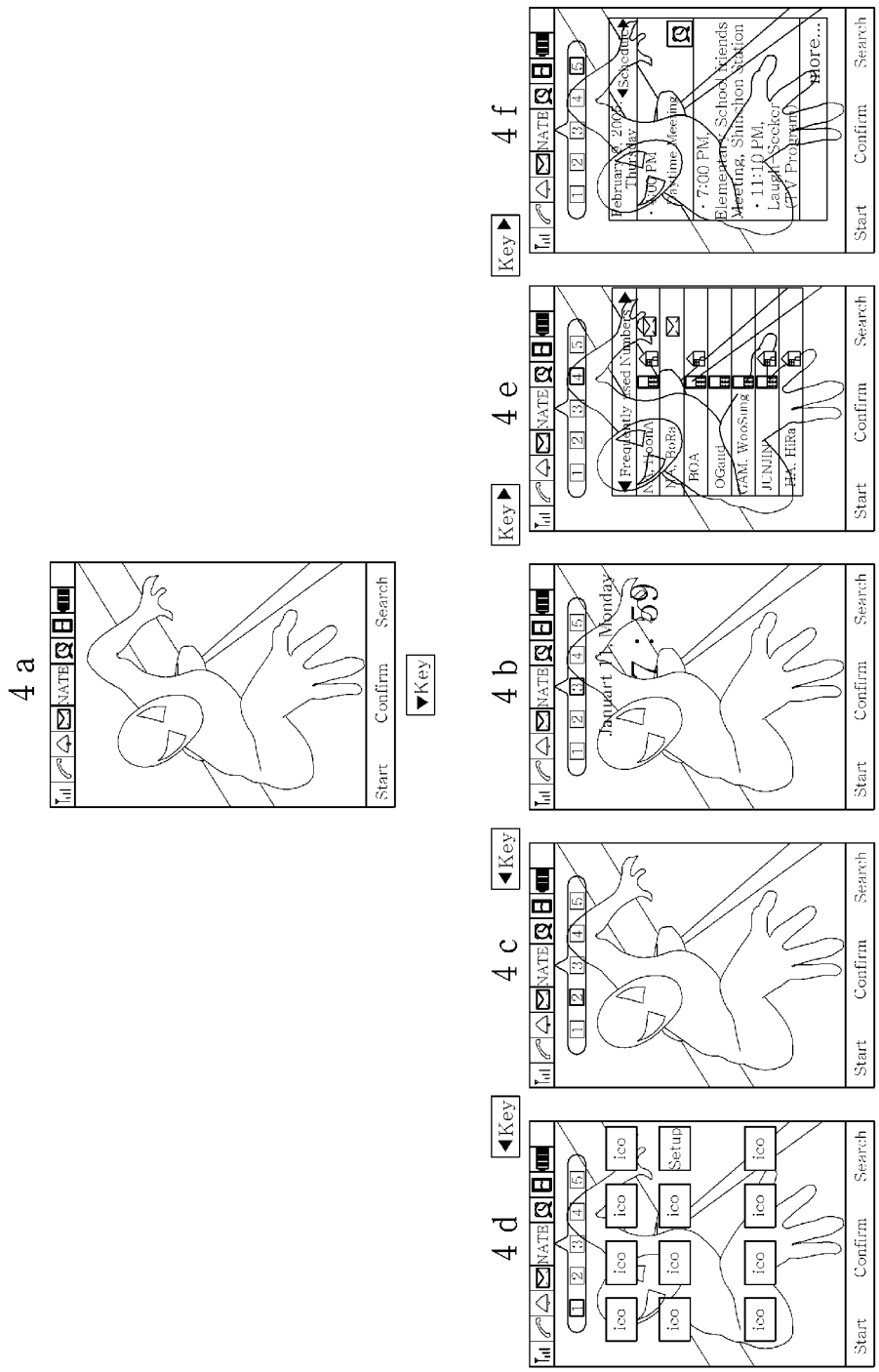
FIGS. 4a to 4f show the screen of a mobile communication terminal, which has conventional key buttons, when the terminal provides a spin-home function.

FIG. 4a shows the screen in an idle mode before the spin-home program is run. When the confirmation key button is operated in the idle mode, the terminal accesses a wireless Internet service (e.g. Nate®). When the downward movement key button is operated in the idle mode, the spin-home program is run and switches the screen to a spin-home screen, as shown in FIG. 4b. Every time the leftward movement key button is operated, applications having a spin-home number of 2 and 1, respectively, are circulated and displayed (FIGS. 4c and 4d). Similarly, every time the rightward movement key button is operated, applications having a spin-home number of 4 and 5, respectively, are circulated and displayed (FIGS. 4e and 4f).

Although the leftward or rightward movement key button is operated to circulate and display the applications, which have been designated as the spin-home, in FIGS. 4a to 4f, the role of each key button is not limited to that in the present disclosure. For example, the downward movement key button may be operated to run the spin-home program and display the application, which has the smallest spin-home number. In addition, the left or rightward movement key button may be operated to circulate and display the applications in the ascending or descending order of spin-home number.

Figure 5:
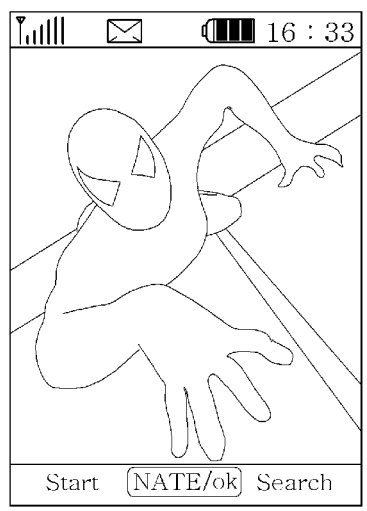
FIGS. 5a and 5b show the screen of a mobile communication terminal when a screen setup program is run.
Figure 5:
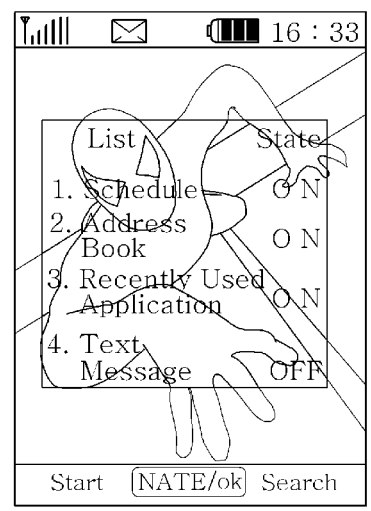

FIGS. 5a and 5b show the screen of a mobile communication terminal when a screen setup program is run.

When a specific key button (e.g. upward movement key button) is operated in an idle mode (FIG. 5a), the screen setup program is run and displays application items, which have been designated as the spin-home, as shown in FIG. 5b. By selecting desired items, the spin-home setup of selected applications is toggled on/off in a convenient manner.

Although a preferred embodiment of the present disclosure has been described for illustrative purposes, those skilled in the art will appreciate that various modifications, additions and substitutions are possible, without departing from the scope and idea of the disclosure as disclosed in the accompanying claims.

INDUSTRIAL APPLICABILITY

As mentioned above, the present disclosure is advantageous in that, even when an application is currently used for the idle screen, it can be easily replaced with another application by single key input. The idle screen setup can also be easily modified.

In addition, various applications (e.g. image, animation, address book, schedule management) can be conveniently circulated and displayed on the idle screen without using shortcuts to run the applications.

The invention claimed is:

1. A method of setting an idle screen to be displayed in an idle state of a mobile terminal among a plurality of screens usable as the idle screen, the method comprising:
    selecting application programs from application programs installed in the mobile terminal, based on a selection from a user, wherein each of the selected application programs is allocated to one of the screens so that the screens present shortcut icons of the application programs allocated thereto;
    displaying, in the idle state, one of the screens as the idle screen on a display unit of the mobile terminal, wherein the displayed idle screen presents the shortcut icons corresponding to the application programs allocated thereto;
    displaying, in response to an idle screen switch request, a next one of the screens on the display unit according to an order of the screens; and
    setting a currently displayed screen as the idle screen to be displayed in the idle state,
    wherein
        the idle screen is displayed on the display unit with indicators corresponding to the screens, and
        an indicator corresponding to the screen, which is set as the idle screen, is displayed distinguishably from the rest of the indicators.

2. The method as claimed in claim 1, wherein the selecting comprises displaying, on the display unit, the shortcut icons of the application programs.

3. The method as claimed in claim 1, wherein the idle screen switch request is inputted from a key button positioned on the mobile phone.

4. The method as claimed in claim 1, wherein the idle screen switch request is a leftward or rightward movement request.

5. The method as claimed in claim 1, wherein the idle screen switch request indicates whether the screens are switched either in an ascending or in a descending order.

6. The method as claimed in claim 1, wherein the screens display an operating condition of the mobile terminal in common, and the displayed operating condition comprises power utilization and radio wave reception strength.

7. The method as claimed in claim 1, wherein the order of the screens is usable in a circular manner.

8. A mobile terminal for setting an idle screen to be displayed in an idle state among a plurality of screens usable as the idle screen, the mobile terminal comprising:
    a user interface configured to be operable by a user;
    a display unit; and
    a control unit configured to:
        select application programs from application programs installed in the mobile terminal, based on an input from the user interface, wherein each of the selected application programs is allocated to one of the screens so that the screens present shortcut icons of the application programs allocated thereto;
        display, in the idle state, one of the screens as the idle screen on the display unit of the mobile terminal, wherein the currently displayed idle screen presents the shortcut icons corresponding to the application programs allocated thereto;

display, in response to an idle screen switch request from the user interface, a next one of the screens on the display unit according to an order of the screens, and set a currently displayed screen as the idle screen to be displayed in the idle state, wherein the control unit is configured to display, on the display unit, the idle screen with indicators corresponding to the screens, and wherein an indicator corresponding to the screen, which is set as the idle screen, is displayed distinguishably from the rest of the indicators.

9. The mobile terminal as claimed in claim 8, wherein the idle screen switch request is a leftward or rightward movement request.

10. The mobile terminal as claimed in claim 8, wherein the idle screen switch request indicates whether the screens are switched either in an ascending or in a descending order.

11. The mobile terminal as claimed in claim 8, wherein the display unit is further configured to display at least one icon for indicating an operating condition of the mobile terminal and said at least one icon remains displayed even with the idle screen switch request, wherein the operating condition comprises at least one of power utilization, radio wave reception strength and time.

12. The mobile terminal as claimed in claim 8, wherein the order of the screens is usable in a circular manner.

13. A non-transitory computer-readable recording medium for storing a program for setting an idle screen to be displayed in an idle state of a mobile terminal among a plurality of screens usable as the idle screen, wherein the program, when executed by the mobile terminal, instructs the mobile terminal to perform:

selecting application programs from application programs installed in the mobile terminal, based on an input from a user, wherein each of the selected application programs is allocated to one of the screens so that the screens presents shortcut icons of the application programs allocated thereto;

displaying, in the idle state, one of the screens as the idle screen on a display unit of the mobile terminal, wherein the displayed idle screen presents the shortcut icons corresponding to the application programs allocated thereto;

displaying, in response to an idle screen switch request, a next one of the screens on the display unit according to an order of the screens; and setting a currently displayed screen as the idle screen to be displayed in the idle state, wherein the idle screen is displayed on the display unit with indicators corresponding to the screens, and an indicator corresponding to the screen, which is set as the idle screen, is displayed distinguishably from the rest of the indicators.

14. The non-transitory computer-readable recording medium as claimed in claim 13, wherein the idle screen switch request is a leftward or rightward movement request.

15. The non-transitory computer-readable recording medium as claimed in claim 13, wherein the screens display an operating condition of the mobile terminal in common, and the displayed operating condition comprises at least one of power utilization, radio wave reception strength and time.

16. The non-transitory computer-readable recording medium as claimed in claim 13, wherein the order of the screens is usable in a circular manner.

* * * * *